May 5, 1953     B. H. SHORT     2,637,204
APPARATUS FOR TESTING DYNAMOELECTRIC MACHINES
Filed April 27, 1950     2 SHEETS—SHEET 1
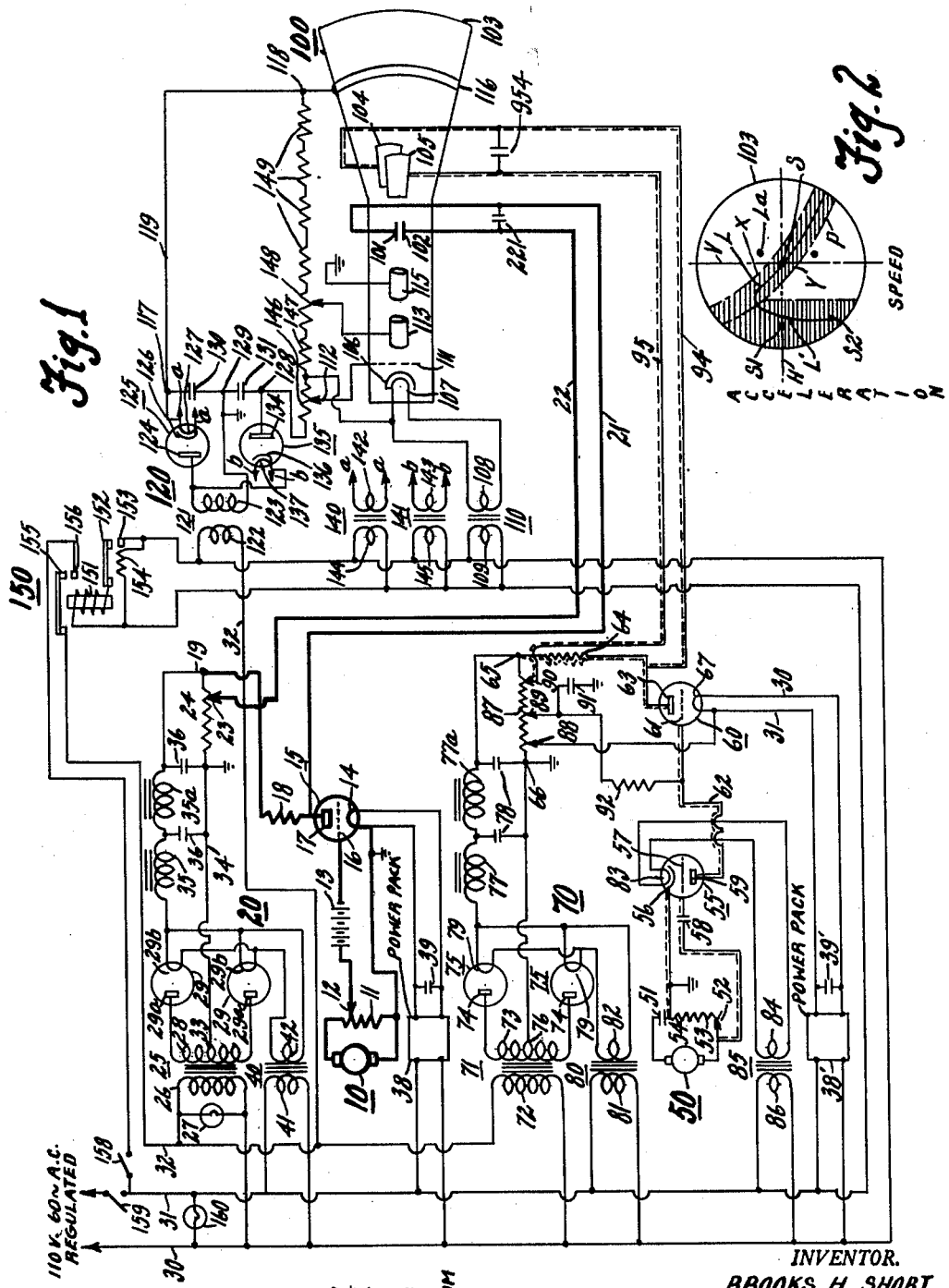
INVENTOR.
BROOKS H. SHORT
BY
HIS ATTORNEYS Patented May 5, 1953

2,637,204

UNITED STATES PATENT OFFICE 2,637,204

APPARATUS FOR TESTING DYNAMO-ELECTRIC MACHINES

Brooks H. Short, Anderson, Ind., assignor to General Motors Corporation, Detroit, Mich., a corporation of Delaware Application April 27, 1950, Serial No. 158,441

5 Claims. (Cl. 73—116)

This application is a continuation in part of my copending application Serial No. 705,003, filed October 23 1946, now abandoned.

This invention relates to apparatus for testing dynamo-electric machines and, more particularly, generators.

An object of the invention is to provide apparatus including a cathode ray tube on the screen of which there is produced a visible indication of the characteristics of the machine being tested. This object is accomplished by apparatus that senses the acceleration characteristics of the tested machine to indicate imperfections if any are present. Since the same imperfections will affect the operation of a motor or a generator, the apparatus uses the tested machine as a motor and provides for the indication of imperfections by showing on the tube screen the speed-torque curve of the machine. Faulty construction is detected by deviation of the speed-torque curve from a speed-torque curve band, which is standard for a good machine made according to the specifications of the machine under test. The apparatus provides two small tachometer generators which are driven by the machine under test. These generators are respectively connected with the pairs of beam deflecting plates of the cathode ray oscilloscope tube through circuits which sense, respectively, speed and acceleration. Initially, the machine, under test, is connected with an operating current source while the armature of the machine is prevented from rotating. Since full stall current is applied to the machine while the armature is stationary, full stall torque is present. After full stall current is applied to the machine, the armature is released. Since the armature is unloaded except for its own mass and the small mass of rotating parts of the tachometer generators, full torque acts to accelerate this mass. Therefore the acceleration of the mass is a function of the torque available. Since the tube indicates change in speed in relation to speed, it indicates the speed-torque characteristic of the machine.

A further object of the invention is to provide for audibly indicating deviation of the speed-torque curve of the tested machine from a standard curve band.

Further objects and advantages of the present invention will be apparent from the following description, reference being had to the accompanying drawing, wherein a preferred embodiment of the present invention is clearly shown.

In the drawing:

Fig. 1 is a wiring diagram of the apparatus.

Fig. 2 is a diagram of the screen of the cathode ray tube, showing the nature of the indication which the apparatus produces.

Figure 3:
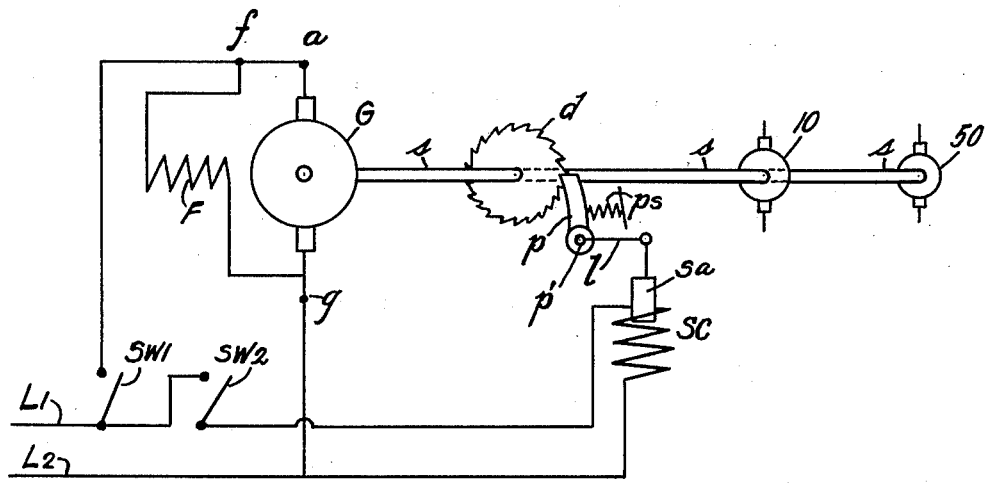
Fig. 3 is a diagram of mechanical connection between the tested machine and tachometer generators and controls for the machine.

Referring to Fig. 3, the tested machine, for example, a generator G, has armature brushes connected with terminals $a$ and $g$, and a field winding F connected with terminals $f$ and $g$. The generator G may be used with a voltage regulator (not shown) connected with terminals $a$ and $f$. For purpose of the test, terminals $a$ and $f$ are directly connected. Terminal $g$ is connected with a current source wire L2 and terminal $f$ is connectible with a current source wire L1 by closing a switch SW1. A solenoid coil SC is connected with the current source by closing a switch SW2.

Through a shaft $s$, generator G drives small tachometer generators 10 and 50. Shaft $s$ is connected with a toothed disc $d$ against which a dog or pawl $p$ is urged by a spring $ps$. Pawl $p$ is pivoted at $p'$ and is connected by a lever $l$ with a solenoid armature $sa$.

To start the test, switch SW1 is closed first to subject the machine, operative as a motor, to full stall current and torque. Then switch SW2 is closed to connect coil SC with the current source to cause pawl $p$ to be retracted from disc $d$ so that the machine will turn the generators 10 and 50 at a speed which increases from zero to maximum at a rate which will be shown on the screen of the cathode ray oscilloscope.

Referring to Fig. 1, a variable resistance 11 is connected across terminals of the generator 10, one terminal of which is connected with ground and with the cathode 14 of an amplifier tube 15 whose grid 16 is connected with a grid bias battery 13 connected with the adjustable contact 12 of the variable resistance 11. The plate 17 of tube 15 is connected through a resistance 18 with a plate voltage terminal 19. Plate 17 is connected by wire 21 with plate 101 of cathode ray tube 100; and the adjacent plate 102 is connected by wire 22 with the movable contact 23 of an adjustable resistance 24. The speed-channel power supply 20 includes transformer 25 whose primary 26 is connected with indicator lamp 27 and with wires 30 and 32 and whose secondary 28 has its ends connected with plates 29a of rectifier tube 29 and whose center tap 33 is connected with wire 34 connected with ground and with the resistance 24. The output of the tube 29 to the plate voltage terminal 19 is filtered by chokes 35 and 35a and condensers 36. The power supply unit 20 includes a transformer 40 whose primary 41 is connected with wires 30 and 31 and whose secondary 42 supplies current for heating the cathodes 29b of the tubes 29.

Tube 15 is a high amplification tube whose change in output voltage is proportional to speed of the machine being tested. In order to effect proper operation of the tube 15, its cathode 14 is connected with a D. C. source provided by power pack 38 whose input terminals are connected with wires 30 and 31 which are connected with a 110 volt A. C. source and whose output terminals are connected with a filtering condenser 39. The power pack 38 supplies 6.3 volts D. C. to the cathode 14 of tube 15.

The screen 103 of cathode ray tube 100 on which the cathode ray produces a luminous spot may be considered as having a horizontal axis H and a vertical axis V (Fig. 2). If the cathode beam is undeflected the spot is at S. For example, if under static conditions voltage of plate 17 of tube 15 is 700 volts, the slide 23 is adjusted along the resistance 24 to provide a bucking voltage of 1,100 volts for example. This causes the spot to move to $S_1$ on axis H.

The terminals of the tachometer generator 50 are connected with a condenser 51 and a sliding contact 52 of an adjustable resistance 53. The junction 54 of the condenser 51 and resistance 53 is grounded and is connected with cathode 56 of an amplifier tube 55 whose grid 57 is connected with a grid bias battery 58 connected with a contactor 52 of resistance 53, and whose plate 59 is connected with wire 62 with the grid 61 of an amplifier tube 60 whose plate 63 is connected through resistance 64 with a plate supply terminal 65 of a torque channel power supply unit 70 having a grounded terminal 66. Unit 70 includes a transformer 71 whose primary 72 is connected with wires 30 and 32 and whose secondary 73 is connected at its end with anodes 74 of rectifier tubes 75. The center tap 76 of the secondary 73 is connected with terminal 66. The output of the unit is filtered by chokes 77 and 77a and capacitors 78. The unit 70 includes a transformer 80 whose primary 81 is connected with wires 30 and 31 and whose secondary 82 supplies current to heat the cathodes 79 of the tubes 75. The cathode 56 of tube 55 is heated by element 83 connected with the secondary 84 of a transformer 85 whose primary 86 is connected with wires 30 and 31.

The cathode 67 of high amplification tube 60 receives 6.3 volts D. C. from a power pack 38' whose input terminals are connected with wires 30 and 31 and whose output terminals are connected with the cathode 67 and with a filter condenser 39'.

Between terminals 65 and 66 of the power supply unit 70, there is connected a voltage divider resistance 87 engaged by adjustable contacts 88, 89 and 90. Contact 88 is connected with cathode 67 of tube 60. Contact 89 is connected with a grounded condenser 91 and with a resistance 92 connected with wire 62.

Plate 63 is connected by wire 94 with plate 104 of tube 100, whose adjacent plate 105 is connected by wire 95 with sliding contact 90. Under static conditions, the slider 90 is adjusted so as to cause the spot to move in the direction parallel to the vertical axis V of the screen 103 to a position $S_2$ (Fig. 2), which may be considered the starting position. Distances horizontally from $S_2$ represent speed of the machine under test, and distances vertically above the horizontal line through $S_2$ represent its acceleration or torque. The trace of the cathode ray on the screen 103 having persistent luminosity is a curve (such as L in Fig. 2) which represents the speed-torque characteristic of the machine. The sliding contact 89 is adjusted to give the proper plate supply to the plate 59 of the tube 55. Contact 88 is adjusted to obtain proper bias on the grid 61 of tube 60, this bias being the difference in voltages of wire 62 and contact 88.

The plates 101, 102 and 104, 105 of tube 100 are located symmetrically with respect to the axis of the tube. The plates 101 and 102 are vertically disposed so that variation in electrostatic field between them will shift the spot horizontally. Plates 104 and 105 are horizontally disposed so that variations in the electrostatic field between them will shift the spot vertically. The tube 100 has a cathode 106 connected with its cathode heater 107 connected with a secondary 108 of a transformer 110 whose primary 109 is connected with wires 30 and 31. Tube 100 has an intensity control element 111 connected with adjustable contact 112, a focusing anode 113 connected with a sliding contact 114, a final accelerating anode 115 which is grounded and an intensifier anode 116 connected with terminal 118 of a high voltage power supply unit 120 for the electronic beam. Condenser 221 is connected between wires 22 and 21 and condenser 954 is connected between wires 95 and 94.

Tube 100 is a Du Mont 20 inch diameter cathode ray tube, model 20AP2. This tube has a long persistence blue screen 103 which retains the trace of spot S for several seconds after the curve has been completed. Several hundred volts are required by each set of deflecting plates 101, 102, and 104, 105 to give the maximum usable deflection. The unit 120 includes a transformer 121 whose primary 122 is connected with wires 30 and 32 and whose secondary 123 is connected with the anode 124 of a rectifier tube 125 whose cathode 126 is connected by wire 119 with terminal 118. Secondary 123 is also connected with cathode 136 of a rectifier tube 135 whose plate 134 is connected with a terminal 128. Transformer secondary 123 is grounded and is connected with a terminal 129. Filter condensers 130 and 131 are connected, respectively, between wire 127 and terminal 129 and between terminal 129 and terminal 128. Cathode heaters 127 and 137 of tubes 125 and 135, respectively, are connected as indicated by arrowheads $a$, $a$ and $b$, $b$ with secondaries 142 and 143 of transformers 140 and 141, respectively, whose primaries 144 and 145 are connected with wires 30 and 31.

Between the terminals 117 and 128 of the power supply unit 120, there is connected a voltage divider comprising a resistance 146 engaged by adjustable contact 112, a resistance 147, a resistance 148 engaged by adjustable contact 114 and four resistances 149. Wire 106a connects cathode 106 with the junction of resistances 146 and 147. The adjustment of contact 112 provides control of intensity and the adjustment of contact 114 provides control of the focusing anode 113.

In order to protect the apparatus against use of the power supply units 20, 70 and 120 before the cathodes of their tubes are heated, a time delay switch unit 150 is provided. Unit 150 includes a relay magnet coil 151 connected with wires 30 and 31 through a thermostat switch comprising a bimetal blade 152 for engaging a contact 153. The bimetal blade is heated by an element 154 connected with wires 30 and 31. After a lapse of time sufficient for the cathodes of the rectifier tubes to become heated, the blade 152 engages the contact 153 to cause energization of the coil 151 which effects the closing of contacts 155 and 156 for connecting wire 32 with wire 31, a manually operated switch 158 having been previously closed. The main power source of 110 volts A. C. is connected with the wires 30 and 31 by the closing of a switch 159 which, when closed, causes an indicator lamp 160 to burn. When, after closing the switch 158, the relay 150 closes its contacts 155, 156, the lamp 27 burns to indicate that the power supply devices are ready for operation.

As stated before, the instrument provides tachometer generators 10 and 50 whose outputs are proportional to the speed of the machine being tested. From these generators there are two channels which influence the operation of the tube 100 in accordance with speed and torque respectively. The speed channel, indicated by heavy lines, includes the generator 10, the amplifier tube 15 and the plates 101 and 102. The torque channel, indicated by dash lines, includes generator 50, a differentiating network comprising the adjustable resistance 53 and the condenser 51, the amplifier tubes 55 and 60 and the plates 104 and 105. This differentiating network causes the feeding of voltage to the amplifier tube 55 which is directly proportional to acceleration of the machine being tested. This takes place because the voltage impressed on the resistance 53 is proportional to the rate of change of voltage which is proportional to the acceleration or rate of change of speed of the machine being tested. In order to obtain this result, the value of resistance 53 must be a small value so that the normal operation of the condenser 51 will not be appreciably effected by a resistance component.

The machine under test is accelerated rapidly from zero to maximum speed to obtain rapid movement of the spot S on the screen 103 so that there appears thereon a continuous trace represented by the line L (Fig. 2) which represents the speed-acceleration characteristic of the machine being tested. Since the speed-acceleration characteristic of the machine is an indication of its torque characteristic, the line L can be considered a fair indication of the torque-speed characteristic of the machine. Since the same imperfections in the construction of the tested machine will affect the operation of the machine as a generator, or as a motor, the trace on the screen can be used to indicate whether such imperfections are present to such extent that the tested machine will not pass inspection. For example, let it be assumed that the trace L, shown in Fig. 2, is the standard of perfection for a good machine made according to the specifications of the machine under test. To pass inspection, the trace of the tested machine should not deviate too much from the standard trace L. The limits of allowable deviation are established by placing on the outside of the screen 103, line X for the high limit and line Y for the low limit. If the trace of the tested machine falls between lines X and Y, the machine passes inspection; and if that trace falls outside of line X or line Y, the machine does not pass inspection. To aid the observer, a mask of opaque paper indicated by the shaded area P can be placed on the screen 103 between lines X and Y.

Figure 4:
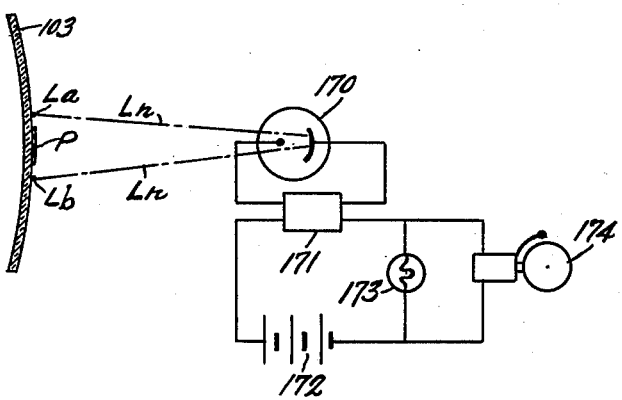
Fig. 4 is a diagram of means for obtaining audible indication of deviation of the speed-torque curve of the tested machine from a standard curve band.

Audible as well as visual indication of failure of a tested machine to pass inspection can be effected by use of the apparatus shown in Fig. 4. When using that apparatus, the ascending portion L' of standard trace L is masked also, as indicated by the shaded area below line Y. The appearance of the trace of the tested machine outside of the masked area on the screen 103 is detected by the use of a photo-electric cell 170. When the trace appears at La or at Lb, for example, the cell 170 receives rays Lr and energizes a relay 171 which connects a current source 172 with an indicator lamp 173 and a buzzer or bell 174.

Satisfactory operation is obtained with the following units: Automatic voltage regulator for 110 v. 60 cycle A. C. input to wires 30 and 31 may be a Thordarson model T9V32.

Power supply units 20 and 70:
　　Transformer 25 _____ Stancor P-8032.
　　Tubes 29 _____ #866.
　　Chokes 35 and 77 ____ 5-20 henries.
　　Chokes 35a and 77a ___ 12 henries.
　　Condensers 36 and 78 _ 2 microfarads.
　　Resistances 24 and 87 _ .50 megohm, 100 watts.

Power supply unit 120:
　　Transformer 121 _____ Thordarson T45158.
　　Tubes 125 and 135 ____ 2 x 2.
　　Condensers 130 and 131 1 microfarad, 3000 volts.
　　Resistance 146 _____ 1.5 megohms.
　　Resistance 147 _____ 1 megohm.
　　Resistance 148 _____ 5 megohms.
　　Resistance 149 _____ 2 megohms.
Transformers 140, 141, 110 Thordarson T-19F82, output 2.5 volts.

Cathode ray tube _____ Du Mont 20AP2.
　　Condenser 221 _____ .5 microfarad.
　　Condenser 954 _____ .3 microfarad.

Speed channel:
　　D. C. tachometer generator 10 _____ Esterline Angus Model C.
　　Resistance 11 _____ 1 megohm.
　　Battery 13 _____ 7.5 volts.
　　Tube 15 _____ #811.
　　Resistance 18 _____ .375 megohm.

Acceleration (torque) channel:
　　D. C. tachometer generator 50 _____ Esterline Angus Model C.
　　Resistance 53 _____ 5 ohms.
　　Condenser 51 _____ 1200 microfarads, 50 volts.
　　Battery 58 _____ 1.5 volts.
　　Tube 55 _____ #6SF5.
　　Resistance 92 _____ .250 megohm.
　　Tube 60 _____ #811.
　　Condenser 91 _____ 8 microfarads, 300 volts.
　　Resistance 64 _____ .375 megohm.
Power packs 38, 38' _____ Mallory rectopower supply, output 6 volts, D. C.
　　Condensers _____ 4000 microfarads, 12 volts.

Time delay relay 150 is set for 60 seconds delay.

While the embodiment of the present invention as herein disclosed, constitutes a preferred form, it is to be understood that other forms might be adopted.

What is claimed is as follows:

1. Apparatus for testing a dynamo-electric-machine operating as a motor and comprising means for preventing operation of the machine while current is being applied thereto for the purpose of operating the machine as a motor, means for rendering the operation preventing means non-operative to allow the machine to increase in speed from zero to a maximum value, two generators driven by the machine and each producing voltages proportional to speed, the rotating parts of the tested machine and the generators providing the mass to be accelerated, a cathode ray oscilloscope tube having pairs of cathode-beam-deflecting plates, one pair being arranged at right angles to the other pair, and having a screen on which the beam makes a visible trace, means for causing the electrostatic field between one pair of the tube plates to be sensitive to the amount of speed of one of the generators through application of said generator output voltage to said plates, and means for causing the electrostatic field between the other pair of tube plates to be sensitive to the rate of change of speed of the other generator through application of said other generator output voltage to said other pair of plates whereby the trace on the tube screen is an indication of speed-acceleration characteristics of the machine.

2. Apparatus according to claim 1 further characterized by an opaque mask on the tube screen shaped to define limits of speed-acceleration characteristics within which the machine may pass inspection, a photo-electric cell which is energized when the trace appears beyond the edges of the mask, an indicator and means for causing operation of the indicator when the cell is energized.

3. Apparatus for testing a dynamo-electric-machine operating as a motor, and comprising means for preventing operation of the machine while current is being applied thereto for the purpose of operating the machine as a motor, means for rendering the operation preventing means non-operative to allow the machine to increase in speed from zero to a maximum value, two generators driven by the machine and each producing voltages proportional to speed, the rotating parts of the tested machine and the generators providing the mass to be accelerated, a cathode ray oscilloscope tube having pairs of cathode-beam-deflecting plates, one pair being arranged at right angles to the other pair, and having a screen on which the beam makes a visible trace, a speed circuit channel in circuit with one of the generators and one of the pairs of tube plates for causing the electrostatic field between the plates to be sensitive to the amount of speed of that generator through application of said generator output voltage to one of said pairs of plates, said channel including an amplifier tube connected in circuit with said pair of oscilloscope plates, a voltage divider connected with the terminals of the generator and a circuit comprising a portion of the voltage divider, a grid biasing source and the grid and cathode of the amplifier tube, a network in circuit with the other generator and sensitive to the rate of change of speed of said other generator, and an acceleration circuit channel in circuit with said network and the other pair of tube plates whereby the electrostatic field between the latter is sensitive to the acceleration of said other generator through application of said other generator output voltage to said other pair of plates, whereby the trace on the tube screen indicates the speed-acceleration characteristic of the machine being tested.

4. Apparatus for testing a dynamo-electric-machine operating as a motor and comprising means for preventing operation of the machine while current is being applied thereto for the purpose of operating the machine as a motor, means for rendering the operation preventing means non-operative to allow the machine to increase in speed from zero to a maximum value, two generators driven by the machine and each producing voltages proportional to speed, the rotating parts of the tested machine and the generators providing the mass to be accelerated, a cathode ray oscilloscope tube having pairs of cathode-beam-deflecting plates, one pair being arranged at right angles to the other pair, and having a screen on which the beam makes a visible trace, a speed circuit channel in circuit with one of the generators and one of the pairs of tube plates for causing the electrostatic field between the plates to be sensitive to the amount of speed of that generator through application of said generator output voltage to said pair of plates, a differentiating network connected with the terminals of said other generator and comprising a condenser and a resistance in series, an amplifier tube connected with the other pair of oscilloscope plates, and a circuit including said resistance, a grid biasing source and the grid and cathode of the amplifier tube, said network providing a voltage to the amplifier tube in direct proportion to the acceleration of the second generator, whereby the trace on the tube screen indicates the speed-acceleration characteristic of the machine being tested.

5. Apparatus for testing a dynamo-electric-machine operating as a motor and comprising means for preventing operation of the machine while current is being applied thereto for the purpose of operating the machine as a motor, means for rendering the operation preventing means non-operative to allow the machine to increase in speed from zero to a maximum value, two generators driven by the machine and each producing voltages proportional to speed, the rotating parts of the tested machine and the generators providing the mass to be accelerated, a cathode ray oscilloscope tube having pairs of cathode-beam-deflecting plates, one pair being arranged at right angles to the other pair, and having a screen on which the beam makes a visible trace, a circuit including the output of one of said generators and one pair of said deflection plates in which the voltage proportional to the speed of said one generator is applied to one pair of deflection plates of said oscilloscope, said circuit including an amplifier tube or circuit with said pair of oscilloscope plates, a voltage divider connected with the terminals of the generator and a circuit comprising a portion of the voltage divider, a grid biasing source and the grid and cathode of the amplifier tube, a differentiating network connected with the terminals of said other generator and comprising a condenser and a resistance in series, an amplifier tube connected with the other pair of oscilloscope plates, and a circuit including said resistance, a grid biasing source and the grid and cathode of the amplifier tube, said network providing a voltage to the amplifier tube in direct proportion to the acceleration of the second generator, whereby the trace on the tube screen indicates the speed-acceleration characteristic of the machine being tested.

BROOKS H. SHORT.

References Cited in the file of this patent

UNITED STATES PATENTS

| Number | Name | Date |
| --- | --- | --- |
| 1,096,942 | Owens | May 19, 1914 |
| 1,960,614 | Anderson | May 29, 1934 |
| 2,306,361 | Stuart | Dec. 22, 1942 |
| 2,383,321 | Kleber | Aug. 21, 1945 |
| 2,464,191 | Wen | Mar. 8, 1949 |
| 2,509,743 | Olinger | May 30, 1950 |
| 2,568,406 | Packer et al. | Sept. 18, 1951 |